(12) United States Patent
Rooney

(10) Patent No.: US 11,393,316 B1
(45) Date of Patent: Jul. 19, 2022

(54) WEARABLE SAFETY DEVICE

(71) Applicant: Garrett Rooney, Oneida, NY (US)

(72) Inventor: Garrett Rooney, Oneida, NY (US)

( * ) Notice: Subject to any disclaimer, the term of this patent is extended or adjusted under 35 U.S.C. 154(b) by 0 days.

(21) Appl. No.: 17/369,214

(22) Filed: Jul. 7, 2021

(51) Int. Cl.
| | | |
|---|---|---|
| *G08B 21/02* | (2006.01) | |
| *F41H 13/00* | (2006.01) | |
| *G08B 27/00* | (2006.01) | |
| *G08B 25/12* | (2006.01) | |
| *G08B 15/00* | (2006.01) | |
| *G01S 19/17* | (2010.01) | |

(52) U.S. Cl.
CPC ..... *G08B 21/0269* (2013.01); *F41H 13/0018* (2013.01); *G01S 19/17* (2013.01); *G08B 15/005* (2013.01); *G08B 25/12* (2013.01); *G08B 27/001* (2013.01)

(58) Field of Classification Search
CPC .................................................. G08B 21/0269
See application file for complete search history.

(56) References Cited

U.S. PATENT DOCUMENTS

| | | | | |
|---|---|---|---|---|
| 10,431,065 | B2* | 10/2019 | Brantley | H04W 12/00 |
| 2014/0049394 | A1* | 2/2014 | Snyder | G08B 21/088 |
| | | | | 340/573.6 |
| 2014/0118149 | A1* | 5/2014 | Elias | G08B 21/0261 |
| | | | | 340/573.4 |
| 2016/0042629 | A1* | 2/2016 | Snyder | G08B 21/08 |
| | | | | 340/573.6 |
| 2017/0124841 | A1* | 5/2017 | Snyder | G08B 21/088 |
| 2018/0025605 | A1* | 1/2018 | Thomas | H04W 4/029 |
| | | | | 455/90.1 |

* cited by examiner

*Primary Examiner* — Travis R Hunnings
(74) *Attorney, Agent, or Firm* — The Iwashko Law Firm, PLLC; Lev Ivan Gabriel Iwashko

(57) ABSTRACT

A wearable safety device, including a main body, a wearable cord disposed on at least a portion of the main body to suspend the main body while being worn, and a circuit board disposed within at least a portion of an interior of the main body and connected to the wearable cord to notify at least one of police and at least one authorized person in response to at least one of the wearable cord detaching from the circuit board and the wearable cord being severed.

8 Claims, 2 Drawing Sheets

WEARABLE SAFETY DEVICE

BACKGROUND

1. Field

The present general inventive concept relates generally to safety, and particularly, to a wearable safety device.

2. Description of the Related Art

Domestic violence, abduction, rape, assault, and/or battery are all dangerous incidents that unfortunately happen on a daily basis to various individuals of all ages. In many cases, an attacker will destroy, confiscate, and/or throw a victim's phone away, which prevents the victim from contacting authorities and/or family members to receive help. The loss of a phone leaves the victim helpless and/or hinders their ability to escape the situation or be found by the police.

Also, during a dangerous situation, the victim is often confused and/or scared which exacerbates the situation because they will be unable to think clearly.

Therefore, there is a wearable safety device that provides another line of defense and can contact law enforcement and/or family members in event of an emergency.

SUMMARY

The present general inventive concept provides a wearable safety device.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a wearable safety device, including a main body, a wearable cord disposed on at least a portion of the main body to suspend the main body while being worn, and a circuit board disposed within at least a portion of an interior of the main body and connected to the wearable cord to notify at least one of police and at least one authorized person in response to at least one of the wearable cord detaching from the circuit board and the wearable cord being severed.

The main body may include a cover screen removably connected to at least a portion of the main body to cover the interior of the main body.

The cover screen may be a one-way mirror.

The circuit board may notify at least of the police and the at least one authorized person using a GPS signal to identify a location of the main body.

The wearable safety device may further include a camera disposed within at least a portion of the main body to record at least one of at least one hostile third party and a surrounding environment in response to at least one of the wearable cord detaching from the circuit board and the wearable cord being severed.

The wearable safety device may further include a button disposed on at least a portion of the main body to notify at least one of the police and the at least one authorized person in response to being depressed.

The wearable safety device may further include an electrocution unit disposed within at least a portion of the main body to send a modulated electric current to an outer surface of the main body in response to depressing the button for a predetermined period of time.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Wearable Safety Device 100
Main Body 110
Cover Screen 111
Wearable Cord 120
Circuit Board 130
Connecting Cord 140
Communication Unit 150
Camera 160
Button 170
Electrocution Unit 180
Power Source 190

Figure 1:
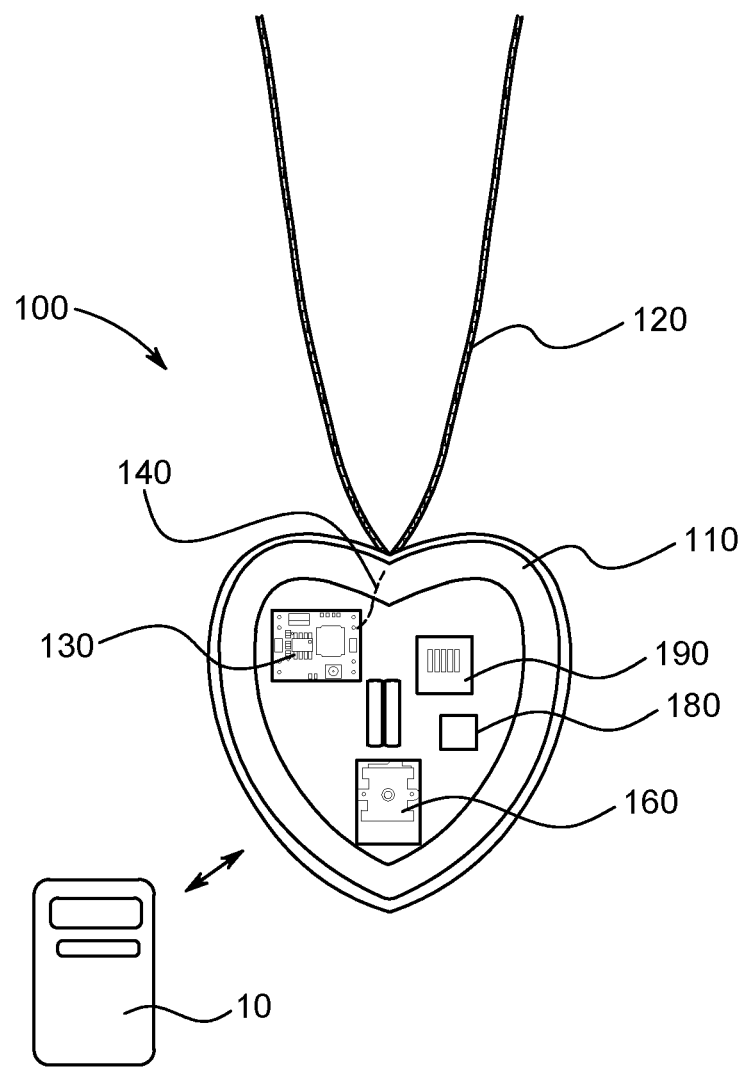
FIG. 1 illustrates a sectional view of a wearable safety device, according to an exemplary embodiment of the present general inventive concept.

FIG. 1 illustrates a sectional view of a wearable safety device 100, according to an exemplary embodiment of the present general inventive concept.

Figure 2:
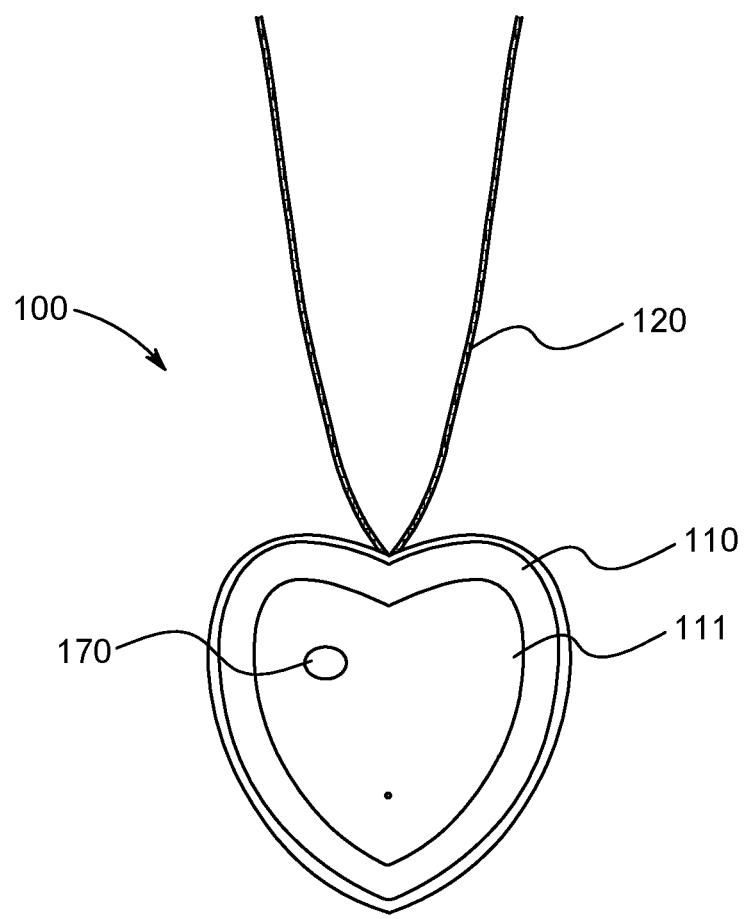
FIG. 2 illustrates a front view of the wearable safety device, according to an exemplary embodiment of the present general inventive concept.

FIG. 2 illustrates a front view of the wearable safety device 100, according to an exemplary embodiment of the present general inventive concept.

The wearable safety device 100 may be constructed from at least one of metal, plastic, wood, glass, and rubber, etc., but is not limited thereto.

The wearable safety device 100 may include a main body 110, a wearable cord 120, a circuit board 130, a connecting cord 140, a communication unit 150, a camera 160, a button 170, an electrocution unit 180, and a power source 190, but is not limited thereto.

Referring to FIGS. 1 and 2, the main body 110 is illustrated to have a heart shape. However, the main body 110 may be flower shaped, star shaped, pearl shaped, diamond shaped, emerald shaped, rectangular, circular, conical, triangular, pentagonal, hexagonal, heptagonal, octagonal, or any other shape known to one of ordinary skill in the art, but is not limited thereto.

The main body 110 may include a cover screen 111, but is not limited thereto.

The main body 110 may be a pendant and/or a jewel. The cover screen 111 may be removably connected to at least a portion of the main body 110. For example, the cover screen 111 may be a barrier (i.e. a door) to cover an interior of the main body 110.

Referring again to FIG. 2, the cover screen 111 is illustrated to be disposed on at least a portion of a first side of the main body 110. However, another cover screen 111 may be disposed on at least a portion of a second side of the main body 110 opposite with respect to the first side. Moreover, the cover screen 111 may be constructed as a one-way mirror, such that the cover screen 111 may be a thin semi-transparent layer of metal to reflect light on an outer surface of the cover barrier 111 and/or facilitate movement of light from an inner surface to the outer surface of the cover barrier 111.

The wearable cord 120 may include a chain, a wire, a string, a rope, a twine, and/or any combination thereof, but is not limited thereto.

The wearable cord 120 may be disposed on at least a portion of the main body 110. Additionally, the wearable cord 120 may form a loop, such that the wearable cord 120 may fit around at least a portion of a body of a user, such as a neck, an arm, a wrist, a finger, a waist, a leg, and/or an ankle. Furthermore, the wearable cord 120 may be adjustable to change a length and/or a size based on a preference of the user. Therefore, the wearable cord 120 may suspend the main body 110 therefrom while being worn.

Referring again to FIGS. 1 and 2, it is important to note that the combination of the main body 110 and/or the wearable cord 120 is illustrated to be a necklace. However, the combination of the main body 110 and/or the wearable cord 120 may be a bracelet, an anklet, a ring, a belt, and/or any other type of worn accessory, but is not limited thereto.

The circuit board 130 may be a printed circuit board and/or any type of circuit board, but is not limited thereto.

The circuit board 130 may include a processing unit and a storage unit, but is not limited thereto.

The processing unit of the circuit board 130 (or central processing unit, CPU) may include electronic circuitry to carry out instructions of a computer program by performing basic arithmetic, logical, control and input/output (I/O) operations specified by the instructions. The processing unit of the circuit board 130 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit of the circuit board 130 may also include a microprocessor and a microcontroller.

The storage unit of the circuit board 130 may include a random access memory (RAM), a read-only memory (ROM), a hard disk, a flash drive, a database connected to the Internet, cloud-based storage, Internet-based storage, or any other type of storage unit.

The circuit board 130 may be disposed within at least a portion of the interior of the main body 110. The processing unit of the circuit board 130 may access the Internet via the communication unit to allow a user to access a website, and/or may allow a mobile application and/or the software application to be executed using the processing unit. For ease of description, the mobile and/or the software application will be hereinafter referred to as an app. The app may be downloaded from the Internet to be stored on the storage unit of the circuit board 130.

The storage unit of the circuit board 130 may be preconfigured with the app to contain emergency contact information, including phone numbers for law enforcement personnel and/or police (i.e., 911). Additionally, the storage unit of the circuit board may be preconfigured to include phone numbers for at least one authorized person, such as a family member, a friend, a spouse, a child, a parent, a cousin, etc.

Alternatively, an external computing device 10 may install the app thereon. The external computing device 10 may include a mobile device, a cell phone, a laptop computer, a desktop computer, a tablet computer, and/or a personal digital assistant (PDA).

The connecting cord 140 may be disposed within at least a portion of the main body 110. The connecting cord 140 may connect the wearable cord 120 to the circuit board 130. The circuit board 130 via the app may continuously monitor a connection of the circuit board 130 to the wearable cord 120. Moreover, the circuit board 130 may trigger an alert command in response to the wearable cord 120 and/or the connecting cord 140 detaching from the circuit board 130, and/or the wearable cord 120 being severed, such as breaking and/or being cut in half. As such, the connecting cord 140 being detached from the circuit board and/or the wearable cord 120 being severed may suggest the user is being attacked by at least one hostile third party.

The communication unit 150 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The communication unit 150 may be disposed within at least a portion of the main body 110 and/or connected to the circuit board 130. The communication unit 150 may receive the alert command from the circuit board 130 to call and/or notify via voice, text, and/or email the police and/or the at least one authorized person. In other words, the police and/or the at least one authorized person may be notified in response to the circuit board 130 triggering the alert command. Furthermore, the communication unit 150 may emit a GPS signal to identify a location of the communication unit 150 and/or the main body 110.

Also, the circuit board 130 via the communication unit 150 may be configured using the external computing device 10 to include contact information for the at least one authorized person. As such, the user experiencing a dangerous situation, such as an attack from the at least one hostile third party, may have a backup device to contact the police and/or the at least one authorized person should the at least one hostile third party destroy a phone of the user. Specifically, if an attacker breaks the wearable cord 120, the circuit board 130 may automatically notify the police and/or the at least one authorized person.

The camera 160 may include any type of camera known to one of ordinary skill in the art, including, but not limited to, an action camera, an animation camera, an autofocus camera, a box camera, a camcorder, a camera phone, a compact camera, a dashboard camera (i.e., a Dashcam), a digital camera, a field camera, a FIREWIRE camera, a helmet camera, a high-speed camera, an instant camera, a keychain camera, a live-preview digital camera, a movie camera, an omnidirectional camera, a pinhole camera, a pocket camera, a pocket video camera, a rangefinder camera, a reflex camera, a remote camera, a stereo camera, a still camera, a still video camera, a subminiature camera, a system camera, a thermal imaging camera, a thermographic camera, a traffic camera, a traffic enforcement camera, a twin-lens reflex camera, a video camera, a view camera, a webcam, a WRIGHT camera, a ZENITH camera, a zoom-lens reflex camera.

The camera 160 may be disposed within at least a portion of the interior of the main body 110 and/or connected to the circuit board 130. Additionally, the camera 160 may record at least one picture and/or at least one video thereon through the cover screen 111 in response to the wearable cord 120 being severed and/or the connecting cord 140 being detached from the circuit board 130, such as the at least one hostile third party and/or a surrounding environment. The camera 160 may discreetly record the at least one hostile third party due to the one-way mirror. The camera 160 may record in two directions, such that the camera 160 may record out to the first side of the main body 110 and/or the second side of the main body 110. Alternatively, the camera 160 may rotate within the interior of the main body 110 to record out the first side and/or the second side of the main body 110.

The button 170 may be disposed on at least a portion of the main body 110. In alternative to detaching the connecting cord 140 from the circuit board 130 and/or severing the wearable cord 120, the circuit board 130 may trigger the alert command in response to depressing the button 170.

Accordingly, the user may preemptively trigger the alert command. Also, the button 170 may be depressed twice in rapid succession to remove the cover screen 111.

The electrocution unit 180 may be disposed within at least a portion of the main body 110. The electrocution unit 180 may include wires connected to an outer surface of the main body 110. The electrocution unit 180 may send a modulated electric current to the outer surface of the main body 110 in response to depressing the button 170 for a predetermined period of time (e.g., five seconds, ten seconds). As such, the electrocution unit 180 may use the main body 110 to incapacitate and/or stun the at least one hostile third party similar to a taser.

The power source 190 may include a battery and a solar cell, but is not limited thereto.

The power source 190 may be disposed within at least a portion of the main body 110. The power source 190 may provide power to the wearable cord 120, the circuit board 130, the connecting cord 140, the communication unit 150, the camera 160, the button 170, and/or the electrocution unit 180.

Therefore, the wearable safety device 100 may automatically contact law enforcement and/or family members during an emergency, even if the user no longer has a phone.

The present general inventive concept may include a wearable safety device 100, including a main body 110, a wearable cord 120 disposed on at least a portion of the main body 110 to suspend the main body 110 while being worn, and a circuit board 130 disposed within at least a portion of an interior of the main body 110 and connected to the wearable cord 120 to notify at least one of police and at least one authorized person in response to at least one of the wearable cord 120 detaching from the circuit board 120 and the wearable cord 120 being severed.

The main body 110 may include a cover screen 111 removably connected to at least a portion of the main body 110 to cover an interior of the main body 110.

The cover screen 111 may be a one-way mirror.

The circuit board 130 may notify at least of the police and the at least one authorized person using a GPS signal to identify a location of the main body 110.

The wearable safety device 100 may further include a camera 160 disposed within at least a portion of the main body 110 to record at least one of at least one hostile third party and a surrounding environment in response to at least one of the wearable cord 120 detaching from the circuit board 130 and the wearable cord 120 being severed.

The wearable safety device 100 may further include a button 170 disposed on at least a portion of the main body 110 to notify at least one of the police and the at least one authorized person in response to being depressed.

The wearable safety device 100 may further include an electrocution unit 180 disposed within at least a portion of the main body 110 to send a modulated electric current to an outer surface of the main body 110 in response to depressing the button 170 for a predetermined period of time.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A wearable safety device, comprising:
a main body;

a wearable cord disposed on at least a portion of the main body to suspend the main body while being worn;

a circuit board disposed within at least a portion of an interior of the main body and connected to the wearable cord to notify at least one of police and at least one authorized person in response to at least one of the wearable cord detaching from the circuit board and the wearable cord being severed; and a camera disposed within at least a portion of the main body to record at least one of at least one hostile third party and a surrounding environment in response to at least one of the wearable cord detaching from the circuit board and the wearable cord being severed.

2. The wearable safety device of claim 1, wherein the main body comprises:

a cover screen removably connected to at least a portion of the main body to cover the interior of the main body.

3. The wearable safety device of claim 2, wherein the cover screen is a one-way mirror.

4. The wearable safety device of claim 1, wherein the circuit board notifies at least of the police and the at least one authorized person using a GPS signal to identify a location of the main body.

5. The wearable safety device of claim 1, further comprising:

a button disposed on at least a portion of the main body to notify at least one of the police and the at least one authorized person in response to being depressed.

6. The wearable safety device of claim 5, further comprising:

an electrocution unit disposed within at least a portion of the main body to send a modulated electric current to an outer surface of the main body in response to depressing the button for a predetermined period of time.

7. A wearable safety device, comprising:

a main body, comprising:

a cover screen removably connected to at least a portion of the main body to cover the interior of the main body, such that the cover screen is a one-way mirror;

a wearable cord disposed on at least a portion of the main body to suspend the main body while being worn; and a circuit board disposed within at least a portion of an interior of the main body and connected to the wearable cord to notify at least one of police and at least one authorized person in response to at least one of the wearable cord detaching from the circuit board and the wearable cord being severed.

8. A wearable safety device, comprising:

a main body;

a wearable cord disposed on at least a portion of the main body to suspend the main body while being worn;

a circuit board disposed within at least a portion of an interior of the main body and connected to the wearable cord to notify at least one of police and at least one authorized person in response to at least one of the wearable cord detaching from the circuit board and the wearable cord being severed;

a button disposed on at least a portion of the main body to notify at least one of the police and the at least one authorized person in response to being depressed; and an electrocution unit disposed within at least a portion of the main body to send a modulated electric current to an outer surface of the main body in response to depressing the button for a predetermined period of time.

\* \* \* \* \*